United States Patent
Warakomski et al.

(10) Patent No.: US 8,236,922 B2
(45) Date of Patent: Aug. 7, 2012

(54) POLYAMIDE POLYMER

(75) Inventors: John M. Warakomski, Midland, MI (US); Jerry E. White, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 463 days.

(21) Appl. No.: 12/533,072

(22) Filed: Jul. 31, 2009

(65) Prior Publication Data

US 2010/0029894 A1     Feb. 4, 2010

Related U.S. Application Data

(60) Provisional application No. 61/085,117, filed on Jul. 31, 2008.

(51) Int. Cl.
*C08G 69/26* (2006.01)
(52) U.S. Cl. ........ 528/335; 525/452; 525/454; 528/310; 528/902; 528/904; 528/905
(58) Field of Classification Search ........... 525/452, 525/454; 528/335, 902, 904, 905
See application file for complete search history.

(56) References Cited

U.S. PATENT DOCUMENTS

| | | | |
|---|---|---|---|
| 3,012,994 A * | 12/1961 | Bell et al. ............... | 528/346 |
| 3,642,715 A | 2/1972 | Allard | |
| 3,875,120 A | 4/1975 | Brinkmann et al. | |
| 3,992,360 A | 11/1976 | Brinkmann et al. | |
| 4,061,622 A | 12/1977 | Onder | |
| 4,094,866 A | 6/1978 | Onder | |
| 6,252,121 B1 | 6/2001 | Argyropoulos et al. | |
| 6,703,475 B1 * | 3/2004 | Deininger et al. ........... | 528/310 |
| 2004/0087754 A1 | 5/2004 | Foley et al. | |
| 2010/0029860 A1 * | 2/2010 | Honma et al. ............... | 525/452 |

FOREIGN PATENT DOCUMENTS

| | | |
|---|---|---|
| CA | 963198 | 2/1975 |
| CA | 963199 | 2/1975 |
| EP | 0146717 | 11/1989 |
| JP | 61257204 | * 11/1986 |
| WO | 2007005594 | 1/2007 |
| WO | 2008144614 | 11/2008 |

OTHER PUBLICATIONS

Bell et al., "Polyamides of 1,4-Cyclohexanebis (methylamine)", Journal of Polymer Science: Part A, 1965, 19-30, vol. 3.
Ridgway, "Polyamides From 1,4-Cyclohexanebis (ethylamine) and Aliphatic Dicarboxylic Acids", Journal of Applied Polymer Science, 1974, 1517-1528, vol. 18, John Wiley & Sons, Inc.
Prince et al., "Cis/Trans Copolyamides of 1,4-Bisaminomethylcyclohexane", Journal of Polymer Science: Part A-1, 1972, 465-470, vol. 10, John Wiley & Sons, Inc.
Ridgway, "Melting Behavior of Polyamides Prepared from Isomeric 1,4-, 1,3- and 1,2- Cyclohexanebis (Alkylamines)" Polymer Letters Edition, 1975, 87-91, vol. 13, John Wiley & Sons, Inc.

* cited by examiner

*Primary Examiner* — Gregory Listvoyb

(57) ABSTRACT

The instant invention provides polyamides, processes for making the polyamides, and articles comprising the polyamides.

12 Claims, No Drawings

POLYAMIDE POLYMER

CROSS-REFERENCE TO RELATED APPLICATION(S)

This application claims benefit of priority from U.S. Provisional Patent Application No. 61/085,117, filed Jul. 31, 2008, which application is incorporated by reference herein in its entirety.

The instant invention is in the field of polyamide polymers.

BACKGROUND OF THE INVENTION

A problem with many engineering polymers such as, for example, thermoplastic polyamides is poor weatherability; if the polymers contain aromatic moieties, then sunlight in the ultraviolet region of the spectrum is absorbed, resulting in photodegradation of the polymers. Evidence of this photodegradation includes discoloration and embrittlement of the polymers.

Ridgway, J. Polym. Sci. Polym. Letts. Ed., 13, 87 (1975); Ridgway, J. Applied Polym. Sci., 18, 1517 (1974); Prince, et al, J. Polym. Sci.: Part A-1, 10, 465 (1972), and Bell, et al, J. Polym. Sci.: Part A, 3, 19 (1965) mention polyamides made from a dicarboxylic acid and a single isomer or a binary mixture of geometric isomers of cyclohexanebis(methylamine). Patent documents FR 2189448 (19730528); DE 2263929 (19721229); DE 2225938 (19720527); DE 2060702 (19701210); DE 2060701 (19701210) mention polyamides made from a dicarboxylic acid and a binary mixture of positional isomers of cyclohexanebis(methylamine), i.e., a mixture of trans-1,3- and trans-1,4-cyclohexanebis(methylamine).

EP146717(B1) mentions the preparation of a polyamide from dodecanedioic acid and 4,4'-methylenebis(phenyl isocyanate).

There is a need in the polymer art for improved weatherability characteristics in engineering polyamides and especially for an engineering thermoplastic polyamide that would be transparent, weatherable, and tough. In addition, solvent resistance, typically imparted by semicrystallinity of the polymer is a desired property.

SUMMARY OF THE INVENTION

In a first embodiment, the instant invention is a polyamide made either by reacting a dicarboxylic acid or dicarboxylic acid derivative with a mixture of diamines comprising cis-1,3-, trans-1,3-, cis-1,4-, and trans-1,4-cyclohexanebis(methylamine) isomers or by reacting the dicarboxylic acid with a mixture of diisocyanates comprising cis-1,3-, trans-1,3-, cis-1,4-, and trans-1,4-bis(isocyanatomethyl)cyclohexane isomers. In some embodiments, the polyamide is made by reacting the dicarboxylic acid or dicarboxylic acid derivative with the mixture of diamines comprising cis-1,3-, trans-1,3-, cis-1,4-, and trans-1,4-cyclohexanebis(methylamine) isomers. In other embodiments, the polyamide is made by reacting the dicarboxylic acid with the mixture of diisocyanates comprising cis-1,3-, trans-1,3-, cis-1,4-, and trans-1,4-bis(isocyanatomethyl)cyclohexane isomers.

Preferably, the polyamides of the first embodiment are thermoplastic polyamides.

In a second embodiment, the instant invention is a process for preparing the polyamide of the first embodiment, the process comprising the step of reacting a dicarboxylic acid or dicarboxylic acid derivative with a mixture of diamines comprising cis-1,3-, trans-1,3-, cis-1,4-, and trans-1,4-cyclohexanebis(methylamine) isomers to give the polyamide of the first embodiment.

In a third embodiment, the instant invention is a process for preparing the polyamide of the first embodiment, the process comprising the step of reacting a dicarboxylic acid with a mixture of diisocyanates comprising cis-1,3-, trans-1,3-, cis-1,4-, and trans-1,4-bis(isocyanatomethyl)cyclohexane isomers to give the polyamide of the first embodiment.

In still another embodiment, the instant invention is an article comprising the polyamide of the first embodiment. Preferred articles comprise membranes or powder coatings.

Additional embodiments of the present invention are described in the following detailed description and claims.

DETAILED DESCRIPTION

The instant invention provides polyamides, processes for making the polyamides, and articles comprising the polyamides as summarized above. In some embodiments, the polyamide preferably is semicrystalline (i.e., showing any evidence of crystallinity, e.g., by DSC, x-ray diffraction, polarized light scattering, etc.) and, more preferably, the semicrystalline polyamide has a crystalline melting point ($T_m$) of 190 degrees Celsius (° C.) or higher, wherein the $T_m$ is determined by differential scanning calorimetry as described below.

For purposes of United States patent practice and other patent practices allowing incorporation of subject matter by reference, and the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls.

In the present application, any lower limit of a range, or any preferred lower limit of the range, may be combined with any upper limit of the range, or any preferred upper limit of the range, to define a preferred embodiment of the range.

In an event where there is a conflict between a value given in a U.S. unit (e.g., millimeters of mercury) and a value given in a standard international unit (e.g., kilopascals), the U.S. unit value controls.

In any embodiment described herein, the open-ended terms "comprising," "comprises," and the like (which are synonymous with "including," "having," and "characterized by") may be replaced by the respective partially closed phrases "consisting essentially of," consists essentially of," and the like or the respective closed phrases "consisting of," "consists of," and the like.

Preferably in the first or second embodiments, the mixture of diamines comprises from 20 weight percent (wt %) to 50 wt % of cis-1,3-cyclohexanebis(methylamine), from 5 wt % to 35 wt % of trans-1,3-cyclohexanebis(methylamine), from 5 wt % to 30 wt % of cis-1,4-cyclohexanebis(methylamine), and from 15 wt % to 50 wt % trans-1,4-cyclohexanebis(methylamine), wherein the weight percents are based on total weight of the mixture of diamines. More preferably, the mixture of diamines comprises about 36 wt % of cis-1,3-cyclohexanebis(methylamine), about 18 wt % of trans-1,3-cyclohexanebis(methylamine), about 13 wt % cis-1,4- cyclohexanebis(methylamine), and about 33 wt % of trans-1,4-cyclohexanebis(methylamine).

Mixtures of positional and geometric isomers of cyclohexanebis(methylamine) are commercially available from The Dow Chemical Company (Midland, Mich.) and may be made according to the teachings of PCT International Patent Application Publication Number WO 2007/005594.

Preferably in the first or third embodiments, the mixture of diisocyanates comprises from 20 wt % to 50 wt % of cis-1,3-bis(isocyanatomethyl)cyclohexane, from 5 wt % to 35 wt % of trans-1,3-bis(isocyanatomethyl)cyclohexane, from 5 wt % to 30 wt % of cis-1,4-bis(isocyanatomethyl)cyclohexane, and from 15 wt % to 50 wt % of trans-1,4-bis(isocyanatomethyl)cyclohexane, wherein the weight percents are based on total weight of the mixture of diisocyanates. More preferably, the mixture of diisocyanates comprises about 36 wt % of cis-1,3-bis(isocyanatomethyl)cyclohexane, about 18 wt % of trans-1,3-bis(isocyanatomethyl)cyclohexane, about 13 wt % of cis-1,4-bis(isocyanatomethyl)cyclohexane, and about 33 wt % of trans-1,4-bis(isocyanatomethyl)cyclohexane.

Mixtures of positional and geometric isomers of bis(isocyanatomethyl)cyclohexane are commercially available from The Dow Chemical Company (Midland, Mich.) and may be made according to the teachings of U.S. Pat. No. 6,252,121 and U.S. Patent Application Publication Number US 2004/0087754.

In some embodiments, the dicarboxylic acid is an alpha, omega-dicarboxylic acid ($\alpha,\omega$)-dicarboxylic acids), more preferably adipic acid, dodecanedioic acid, or azelaic acid, still more preferably adipic acid or dodecanedioic acid. In other embodiments, the dicarboxylic acid may optionally comprise a mixture of two or more different dicarboxylic acids.

In still other embodiments, a derivative of the dicarboxylic acid is employed instead of the dicarboxylic acid, wherein the derivative is a dicarboxylic acid monoester; dicarboxylic acid diester; dicarboxylic acid monoester monoacid chloride; dicarboxylic acid monoacid chloride; dicarboxylic diacid chloride (i.e., Cl(O)C—R—C(O)Cl, wherein (O)C—R—C(O) is a formal residual of the dicarboxylic diacid); or dicarboxylic anhydride. A dicarboxylic diester may be a mixed dicarboxylic diester (e.g., monomethyl-monoethyl diester) or a uniform dicarboxylic diester (e.g., bismethyl diester). Preferred dicarboxylic acid derivatives are dicarboxylic anhydrides or, more preferably, dicarboxylic diesters or dicarboxylic diacid chlorides. Preferred dicarboxylic diesters are uniform dicarboxylic diesters, more preferably uniform dicarboxylic ($C_1$-$C_4$)diesters, still more preferably dicarboxylic dimethyl esters.

The article comprising the polyamide of the first embodiment may be formed, for example, by techniques such as injection molding, blow molding, compression molding, thermoforming, sheet extrusion or coextrusion, film extrusion or coextrusion, extrusion coating, and profile extrusion. The article may be, for example, a glazing, film, foam, sheet, coating, or a preferred article. In some embodiments, the preferred article is an automotive sunroof, automotive lighting component (e.g., lens, reflector, housing, and/or mounting), automotive instrument panel, automotive trim component, optical lens, eyewear frame, eyewear lens, lighting globe, lighting dome, utility light (e.g., surgical light, reflector, and flashlight), blood collection vial, dialysis component, medical device, sporting equipment (e.g., as part of snow or water skis, racquet (e.g., tennis and squash racquets), and watercraft), personal protective equipment, an extruded shaped article, an extruded hollow structure article, or a molded article. The lighting globe and dome are especially useful in harsh outdoor and industrial environments where durability and weatherability are required. The personal protective equipment is especially useful for recreation and industry (e.g., helmet, face shield, shin guard). Preferably, the glazing is an architectural glazing, security/ballistic glazing, vehicle (bus, rail, automotive, aircraft, military) glazing, sign glazing, display glazing, greenhouse glazing, solarium glazing, skylight glazing, or solar cell (e.g., for heating water) glazing. Preferably, the film comprising the polyamide of the first embodiment may be formed directly via an interfacial polymerization process. Preferably, the foam is an extruded foam. Preferably, the coating is a powder coating.

In another embodiment, the article is a composite film comprising a film and a support, the film being in adhering operative contact with the support. Preferably, the composite film comprises a water purification membrane.

In still another embodiment, the article is a composite powder coating comprising a powder coating and a metal, the powder coating being in adhering operative contact with the metal. The powder coating is useful, for example, for protecting metal from corrosion. The powder coating may be prepared by heating the metal to a temperature above the melting point of the polyamide of the first embodiment, and then applying the polyamide of the first embodiment in a form of a finely ground powder to the heated metal. The polyamide of the first embodiment melts and forms a continuous coating in adhering operative contact to give a coated heated metal, which is allowed to cool.

TESTING PROTOCOLS

Differential Scanning Calorimetry (DSC)

Differential scanning calorimetry is recorded on a TA Instruments Q100 V 9.8 DSC at heating rate of 10° C. per minute from room temperature to 300° C., cooling rate of 10° C. per minute to 20° C., then a second heating scan at 10° C. per minute to 300° C. Analyses are done using TA Instruments Universal Analysis 2000 software, version 4.3 A.

Several pieces of data are obtained from the DSC scans. Glass transition temperature ($T_g$) is the second order glass transition temperature, obtained from the second heating scan. Cold crystallization temperature ($T_{cc}$) is the first order exothermic crystallization transition temperature upon heating, measured at the peak, and obtained from the second heating scan. Crystalline melting point $T_m$ is the first order endothermic melting transition temperature, measured at the peak, and obtained from the second heating scan. Temperature of crystallization from the melt ($T_{ch}$) is the first order exothermic crystallization transition temperature upon cooling from the melt, measured at the peak and obtained from the cooling scan.

Thermogravimetric Analysis (TGA)

Thermogravimetric Analysis is done on a TA Instruments SDT Q600 V8.2 TGA at heating rate of 10° C. per minute from room temperature to 1000° C. under nitrogen. The temperatures for 2.00% weight loss (T–2% wt loss) and 5.00% weight loss (T–5% wt loss) are recorded in ° C.

Cyclohexanebis(methylamines) Mixture 1

A mixture consisting essentially of 36 wt % cis-1,3-cyclohexanebis(methylamine), 18 wt % trans-1,3-cyclohexanebis(methylamine), 13 wt % cis-1,4-cyclohexanebis(methylamine), and 33 wt % trans-1,4-bis cyclohexanebis(methylamine) and having a total purity of greater than 99.8% is produced by The Dow Chemical Company.

Diisocyanates Mixture 1

A mixture of consisting essentially of 36% cis-1,3-bis(isocyanatomethyl)cyclohexane, 18% trans-1,3-bis(isocyanatomethyl)cyclohexane, 13% cis-1,4-bis(isocyanatomethyl)cyclohexane, and 33% trans-1,4-bis(isocyanatomethyl)cyclohexane is produced by The Dow Chemical Company.

Comparative Example 1 (CE1)

The procedure of Example 1 (see below) is repeated except using 4,4'-methylenebis(2-methylcyclohexylamine) (0.06400 moles, 15.26 grams) instead of Cyclohexanebis(methylamines) Mixture 1 and dodecanedioic acid (0.06400 moles, 14.74 grams) instead of adipic acid. The resulting polymer is a laboratory reproduction of a commercial polymer, GRILAMID™ TR-90, made and offered for sale by EMS-Chemie. The resulting polyamide is amorphous, with no evidence of crystallization or melting. DSC and TGA data are listed below in Table 1.

Comparative Example 2 (CE2)

The procedure of Example 1 (see below) is repeated with adipic acid (0.07801 moles, 11.40 grams) except using 4,4'-methylenebis(2-methylcyclohexylamine) (0.07801 moles, 18.60 grams) instead of Cyclohexanebis(methylamines) Mixture 1. The resulting polyamide is amorphous, with no evidence of crystallization or melting. DSC and TGA data are listed below in Table 1.

EXAMPLES OF THE PRESENT INVENTION

Example 1

A polyamide of the instant invention is synthesized by melt polymerization using Cyclohexanebis(methylamines) Mixture 1 and adipic acid (Sigma-Aldrich Company).

Polymerization is done in the melt starting at atmospheric pressure, then ending with full vacuum to remove water and drive the reaction to complete conversion; temperature is also increased during the process. This procedure is followed so that oligomers are gradually built up and monomers are not prematurely lost due to devolatilization. In a stainless steel beaker, a eutectic salt bath of 53 wt % potassium nitrate, 40 wt % sodium nitrite, and 7 wt % sodium nitrate is prepared and heated to 170° C. with a GLAS-COL™ (Templeton Coal Company, Inc.) heating jacket. The apparatus comprises a 100 mL round bottom flask, straight take off adapter, stirrer adapter, electric stirrer motor, glass stirrer shaft, and glass stirrer paddle. The take off adapter is connected to a dry ice (i.e., solid $CO_2$) trap. Vacuum is provided by an Edwards 18 vacuum pump and controlled with a needle valve. Nitrogen gas is passed through a column of DRIERITE™ (W.A. Hammond Drierite Company, Ltd.) desiccant and supplied to the reactor via a Firestone valve. Vacuum is measured by a closed end mercury manometer and McLeod gauge. Ground glass joints are assembled with high vacuum silicon grease. The stirrer lubricating well is filled with mineral oil thickened with 20% poly(t-butylstyrene) to provide a good seal.

Equal mole amounts (30.0 grams total) of the adipic acid (0.1040 moles, 15.20 grams) and Cyclohexanebis(methylamines) Mixture 1 (0.1040 moles, 14.80 grams) are weighed into a clean dry 100 mL round bottom flask then assembled onto the apparatus. The contents are stirred briefly at 20 revolutions per minute (rpm) to mix the monomer ingredients. Using the needle valve and Firestone valve, the flask is briefly evacuated to about 100 millimeters mercury (mm Hg) (i.e., 13 kiloPascals (kPa)), refilled with nitrogen, and repeated three times, ending with the reactor under nitrogen. Heating tape is wrapped around the vacuum take off adapter and set to 80° C. The molten 170° C. salt bath is raised so the bath level is slightly below the bottom of the flask joint and the stirrer is set to 100 rpm. The following temperature and pressure schedule is followed: 30 minutes at 200° C. and 760 mm Hg (101 kPa), nitrogen; 45 minutes at 250° C. and 760 mm Hg (101 kPa), nitrogen; 45 minutes at 300° C. and 760 mm Hg (101 kPa), nitrogen; 15 minutes at 300° C. and 300 mm Hg (39 kPa) vacuum; then 15 minutes at 300° C. and 100 mm Hg (13 kPa) vacuum. Finally at 300° C., full vacuum (about 0.1 mm Hg or 0.02 kPa) is applied until stirrer shuts down due to overtorque at 65 ounce-inch (oz-in, i.e., 0.047 kilogrammeter (kg-m))), typically less than 15 minutes. The reaction is shut down by raising the stirrer shaft, filling the system with nitrogen, shutting off heating tape, and lowering the molten salt bath. When the flask is cool the polymer is recovered by wrapping the flask in KEVLAR™ (E. I. du Pont de Nemours and Company) cloth, then cracking the glass with a hammer.

The resulting polyamide is semi-crystalline. This polyamide also exhibits excellent thermal stability. DSC and TGA data are listed below in Table 1.

Example 2

The procedure of Example 1 is repeated with Cyclohexanebis(methylamines) Mixture 1 (0.1040 moles, 14.80 grams) and adipic acid (0.1040 moles, 15.20 grams). The resulting polyamide is semi-crystalline. DSC and TGA data are listed below in Table 1.

Example 3

The procedure of Example 1 is repeated with Cyclohexanebis(methylamines) Mixture 1 (0.08053 moles, 11.45 grams) except using dodecanedioic acid (0.08053 moles, 18.55 grams) instead of adipic acid. The resulting polyamide is semi-crystalline. DSC and TGA data are listed below in Table 1.

Example 4

The procedure of Example 3 is repeated with Cyclohexanebis(methylamines) Mixture 1 (0.08053 moles, 11.45 grams) and dodecanedioic acid (0.08053 moles, 18.55 grams). The resulting polyamide is semi-crystalline. DSC and TGA data are listed below in Table 1.

Example 5

The procedure of Example 3 is repeated with Cyclohexanebis(methylamines) Mixture 1 (0.08053 moles, 11.45 grams) and dodecanedioic acid (0.08053 moles, 18.55 grams). The resulting polyamide is semi-crystalline. DSC and TGA data are listed below in Table 1.

Example 6

The procedure of Example 1 is repeated with Cyclohexanebis(methylamines) Mixture 1 (0.09078 moles, 12.91 grams) except using azelaic acid (0.09078 moles, 17.09 grams) instead of adipic acid. The resulting polyamide is amorphous, with no evidence of crystallization or melting. DSC and TGA data are listed below in Table 1.

Example 7

The procedure of Example 1 is repeated with Cyclohexanebis(methylamines) Mixture 1 (0.08535 moles, 12.14 grams) except using an equal mole mixture of dodecanedioic acid (0.04268 moles, 9.83 grams) and azelaic acid (0.04268 moles, 8.03 grams) instead of adipic acid alone. The resulting polyamide is amorphous, with no evidence of crystallization or melting. DSC and TGA data are listed below in Table 1.

Example 8

The procedure of Example 1 is repeated with Cyclohexanebis(methylamines) Mixture 1 (0.09078 moles, 12.91 grams) except using an equal mole mixture of dodecanedioic acid (0.04539 moles, 10.45 grams) and adipic acid (0.04539 moles, 6.63 grams) instead of adipic acid alone. The resulting polyamide is amorphous, with no evidence of crystallization or melting. DSC and TGA data are listed below in Table 1.

Example 9

The procedure of Example 1 is repeated with Cyclohexanebis(methylamines) Mixture 1 (0.09696 moles, 13.79 grams) except using an equal mole mixture of adipic acid (0.04848 moles, 7.08 grams) and azelaic acid (0.04848 moles, 9.12 grams) instead of adipic acid alone. The resulting polyamide is amorphous, with no evidence of crystallization or melting. DSC and TGA data are listed below in Table 1.

Example 10

The procedure of Example 1 is repeated with adipic acid (0.08920 moles, 13.03 grams) except using equal mole amounts of Cyclohexanebis(methylamines) Mixture 1 (0.04460 moles, 6.34 grams) and 4,4'-methylenebis(2-methylcyclohexylamine) (0.04460 moles, 10.63 grams; obtained from Sigma-Aldrich) instead of Cyclohexanebis(methylamines) Mixture 1 alone. The resulting polyamide is amorphous, with no evidence of crystallization or melting. DSC and TGA data are listed below in Table 1.

Example 11

The procedure of Example 1 is repeated except using equal mole amounts of Cyclohexanebis(methylamines) Mixture 1 (0.03566 moles, 5.07 grams) and is 4,4'-methylenebis(2-methylcyclohexylamine) (0.03566 moles, 8.50 grams) instead of Cyclohexanebis(methylamines) Mixture 1 alone and dodecanedioic acid (0.07132 moles, 16.42 grams) instead of adipic acid. The resulting polyamide is amorphous, with no evidence of crystallization or melting. DSC and TGA data are listed below in Table 1.

Example 12

A polyamide of the instant invention is synthesized by melt polymerization using adipic acid (0.09073 moles, 16.74 grams) and Diisocyanates Mixture 1 (0.09242 moles, 13.26 grams) as the nitrogen-containing monomer (instead of Cyclohexanebis(methylamines) Mixture 1 of Example 1). This monomer feed represents an isocyanate to dicarboxylic acid molar ratio of 0.95; a slight deficiency of isocyanate is used to prevent potential cross linking.

The polymerization apparatus and procedure are the same as those in Example 1, except the time, temperature, and pressure schedule is modified as follows: The flask and contents are heated for 1 minute at 170° C. and 760 mm Hg (101 kPa), nitrogen to start the polymerization, then the hot salt bath is lowered to remove the heat source. The polymerization is allowed to proceed at ambient temperature for 30 minutes, then this heating schedule is followed: heat 15 minutes at 170° C. and 760 mm Hg nitrogen; 15 minutes at 200° C. and 760 mm Hg (101 kPa), nitrogen; 15 minutes at 250° C. and 750 mm Hg (98 kPa), nitrogen; 15 minutes at 300° C. and 150 mm Hg (20 kPa) vacuum, then finally 30 minutes at 325° C. and 0.1 mm Hg (0.02 kPa) vacuum.

Even at the end of the polymerization, the polymer is stirable, indicating lower molecular weight than the same polymer made from the corresponding diamine monomer. The resulting polyamide is semi-crystalline, with $T_g$=85° C., $T_{cc}$=169° C., and $T_m$=220° C. Glass transition and melting points are depressed compared to those of the polyamides of Examples 1 and 2 due to lower molecular weight of this polymer. By thermogravimetric analysis, 2% weight loss is observed at 345° C., due to loss of low molecular weight materials. The polymer does not degrade until greater than 400° C.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended

TABLE 1

Differential Scanning Calorimetry and Thermogravimetric Data

| Example Number | DSC Data | | | | TGA Data | | Physical form of polyamide |
|---|---|---|---|---|---|---|---|
| | $T_g$ (° C.) | $T_{cc}$ (° C.) | $T_m$ (° C.) | $T_{ch}$ (° C.) | T - 2% wt loss (° C.) | T - 5% wt loss (° C.) | |
| 1 | 109 | 181 | 240 | 162 | 382 | 400 | semicrystalline |
| 2 | 108 | 171 | 242 | 166 | 393 | 406 | semicrystalline |
| 3 | 80 | 164 | 196 | NTO[a] | 393 | 425 | semicrystalline |
| 4 | 82 | NTO | (b) | (b) | 423 | 432 | semicrystalline |
| 5 | 81 | NTO | (c) | (c) | 417 | 431 | semicrystalline |
| 6 | 91 | NTO | NTO | NTO | 410 | 429 | amorphous |
| 7 | 84 | NTO | NTO | NTO | 416 | 430 | amorphous |
| 8 | 96 | NTO | NTO | NTO | 405 | 419 | amorphous |
| 9 | 99 | NTO | NTO | NTO | 400 | 413 | amorphous |
| 10 | 147 | NTO | NTO | NTO | 400 | 415 | amorphous |
| 11 | 112 | NTO | NTO | NTO | 413 | 427 | amorphous |
| CE1 | 153 | NTO | NTO | NTO | 416 | 425 | amorphous |
| CE2 | 188 | NTO | NTO | NTO | 404 | 416 | amorphous |

[a]NTO means no transition is observed;
(b) observed $T_{ch}$ of 150° C. and $T_m$ of 194° C. only on first heating scan; and
(c) observed $T_{ch}$ of 155° C. and $T_m$ of 197° C. only on first heating scan.

to cover such departures from the present disclosure as come within the known or customary practice in the art to which this invention pertains and which fall within the limits of the following claims.

What is claimed is:

1. A polyamide made by reacting a dicarboxylic acid with a mixture of diisocyanates comprises from 20 weight percent to 50 weight percent of cis-1,3-bis(isocyanatomethyl)cyclohexane, from 5 weight percent to 35 weight percent of trans-1,3-bis(isocyanatomethyl)cyclohexane, from 5 weight percent to 30 weight percent of cis-1,4-bis(isocyanatomethyl) cyclohexane, and from 15 weight percent to 50 weight percent of trans-1,4-bis(isocyanatomethyl)cyclohexane, wherein the weight percent are based on total weight of the mixture of diisocyanates.

2. A polyamide of claim 1, wherein the mixture of diisocyanates comprises about 36 weight percent of cis-1,3-bis(isocyanatomethyl)cyclohexane, about 18 weight percent of trans-1,3-bis(isocyanatomethyl)cyclohexane, about 13 weight percent of cis-1,4-bis(isocyanatomethyl)cyclohexane, and about 33 weight percent of trans-1,4-bis(isocyanatomethyl)cyclohexane.

3. A polyamide of claim 1, wherein the dicarboxylic acid comprises a mixture of two or more different dicarboxylic acids.

4. A polyamide of claim 1, wherein each dicarboxylic acid independently is an alpha,omega-dicarboxylic acid ($\alpha,\omega$-dicarboxylic acid).

5. A polyamide of claim 4, wherein each $\alpha,\omega$-dicarboxylic acid independently is adipic acid, dodecanedioic acid, or azelaic acid.

6. A polyamide of claim 5, wherein each $\alpha,\omega$-dicarboxylic acid independently is adipic acid or dodecanedioic acid.

7. A polyamide of claim 1, wherein the polyamide is semi-crystalline.

8. An article comprising the polyamide of claim 1.

9. An article of claim 8, wherein the article is an architectural glazing, security/ballistic glazing, vehicle glazing, sign glazing, display glazing, greenhouse glazing, solarium glazing, skylight glazing, solar cell glazing, photovoltaic cell glazing, automotive sunroof, automotive lighting component, automotive instrument panel, automotive trim component, an optical lens, eyeware frame, eyewear lens, lighting globe, lighting dome, utility light, blood collection vial, dialysis component, medical device, sporting equipment, personal protective equipment, film, foam, coating, sheet, an extruded shaped article, an extruded hollow structure article, or a molded article.

10. An article of claim 9, wherein the article is a composite film comprising a film and a support, the film being in adhering operative contact with the support.

11. An article of claim 10, wherein the composite film comprises a water purification membrane.

12. An article of claim 9, wherein the article is a composite powder coating comprising a powder coating and a metal, the powder coating being in adhering operative contact with the metal.

* * * * *